United States Patent [19]

Matz

[11] 3,839,600

[45] Oct. 1, 1974

[54] TRANSCRIBE CONTROL CIRCUIT FOR A DICTATING SYSTEM

[75] Inventor: Bjorn J. Matz, Forest Hills, N.Y.

[73] Assignee: Dictaphone Corporation, Rye, N.Y.

[22] Filed: Jan. 29, 1973

[21] Appl. No.: 327,643

[52] U.S. Cl. .......................... 179/100.1 DR, 179/6 E

[51] Int. Cl. .......................... H04m 11/10

[58] Field of Search. 179/6 E, 100.1 DR, 100.1 VC, 179/2 A, 1 H, 100.2 E, 100.2 S, 100.2 Z; 274/46 D

[56] References Cited

UNITED STATES PATENTS

| | | | |
|---|---|---|---|
| 1,551,319 | 8/1925 | Meyberg | 179/100.1 VC |
| 2,200,351 | 5/1940 | Whitehead et al. | 179/100.1 VC |
| 3,111,635 | 11/1963 | Skov | 179/100.4 C |
| 3,609,250 | 9/1971 | Morris | 179/100.1 VC |
| 3,712,961 | 1/1973 | Nye | 179/100.1 DR |

*Primary Examiner*—Bernard Konick
*Assistant Examiner*—Stewart Levy
*Attorney, Agent, or Firm*—Curtis, Morris & Safford

[57] ABSTRACT

A control circuit for coupling a central record/-playback unit of an endless tape loop recording system with an external magnetic tape recorder including an audio preamplifier for receiving and amplifying audio signals from the external recorder and supplying them to both the recording section of the central record/-playback unit fo re-recording on the endless loop of tape and to the seizure circuit of the central record/-playback unit to block the seizure of the system by any of a plurality of remote dictating stations and a voltage operated switch for operating the motor and tape controls of the central record/playback unit and the external recorder in response to the presence of the audio signals from the external recorder. Manual and tape loop tautness sensitive switches are also provided to control the re-recording operation.

7 Claims, 3 Drawing Figures

PATENTED OCT 1 1974

3,839,600

SHEET 3 OF 3

TRANSCRIBE CONTROL CIRCUIT FOR A DICTATING SYSTEM

BACKGROUND OF THE INVENTION

The invention relates to a dictating system of the type having a plurality of remote dictating stations which control a central record/playback, endless tape loop unit and more particularly to a transcribe control circuit for coupling an external tape recorder to such a dictating system.

In such dictating systems it is sometimes desirable to provide means for connecting an external recorder to the central record/playback unit so that dictation recorded, for example on a portable tape cassette, can be re-recorded on the endless loop of recording material within the central record/playback unit for ease in transcribing the material. One problem in directly connecting such an external tape recording unit to the central record/playback unit is that unless the signal being re-recorded in the central record/playback unit is monitored by an operator the complete tape in the external tape recorder must be played through the external recorder regardless of whether signals were recorded on the whole tape or not. This is an inefficient use of the central record/playback unit which would otherwise be available for use with the remote dictating stations.

A further problem of some prior systems is that in the event that the loop of tape within the central record/playback unit which is available for dictation is insufficient to accommodate the message recorded on the external tape then the central record/playback unit will stop its operation in the middle of the re-recording and an operator will have to replay the tape loop and the external tape in order to determine at what point the re-recording process ceased. This requirement of an operator to monitor the re-recording process is a serious problem since it counters any advantage obtained in transcribing from the central record/playback unit and makes it nearly as easy to directly transcribe the tape from the external tape recorder.

SUMMARY OF THE INVENTION

The above and other disadvantages are overcome by the present invention of a transcribe control circuit for interconnecting an external source of pre-recorded signals with the central record/playback unit of an endless recording loop dictating system. The transcribe module of the invention includes a preamplifier for receiving the signals from the external source and for supplying the amplified signals to the input of the central record/playback unit for re-recording and for simultaneously seizing control of the electro-mechanical tape drive circuits of the central record/playback unit. The transcribe module also includes a signal activated switching circuit which controls the operation of both the external source and the central record/playback unit in response to the signals from the external source. If the signals cease for a predetermined period of time the signal activated switching circuit automatically shuts down the external source and the re-recording operation of the central record/playback unit.

Additionally, the transcribe module of the invention includes an indicator circuit which is responsive to a recording loop tautness sensing switch within the central record/playback unit. The recording loop tautness switch is activated when the loop of available recording material for dictation has been exhausted and the closing of this switch causes the indicator circuit to flash a light within the transcribe module and to terminate the rerecording operation.

The present invention is intended for use particularly with the DICTATING AND TRANSCRIBING SYSTEM described in co-pending application Ser. No. 317,928 filed Dec. 26, 1972 of which the applicant is a joint inventor, with the PRIVACY AND SEIZURE CONTROL CIRCUIT FOR A REMOTE STATION DICTATING SYSTEM described in co-pending application Ser. No. 322,530 filed Jan. 10, 1973 of which the applicant is the sole inventor and with the FARTHEST CIRCUIT FOR A REMOTE STATION DICTATING SYSTEM described in co-pending application Ser. No. 322,373 filed Jan. 10, 1973 of which the applicant is a sole inventor. The disclosures in these applications are incorporated herein by reference.

It is therefore an object of the present invention to provide a simplified control circuit for coupling an external signal source to the central record/playback unit of a remote station dictating system.

It is still another object of the present invention to provide a solid state circuit for automatically monitoring the connection of an external source of signals to a central record/playback unit of a dictating system.

It is still a further object of the present invention to provide a control circuit for connecting an external source of signals to a central record/playback unit of a dictating system for recording the signals in the central record/playback unit, which control circuit automatically monitors both the supply of external signals and the tautness of the recording loop within the central record/playback unit.

The foregoing and other objectives, features, and advantages of the invention will be more readily understood upon consideration of the following detailed description of certain preferred embodiments of the invention, taken in conjunction with the accompanying drawings.

DESCRIPTION OF THE PREFERRED EMBODIMENT

Figure 1:
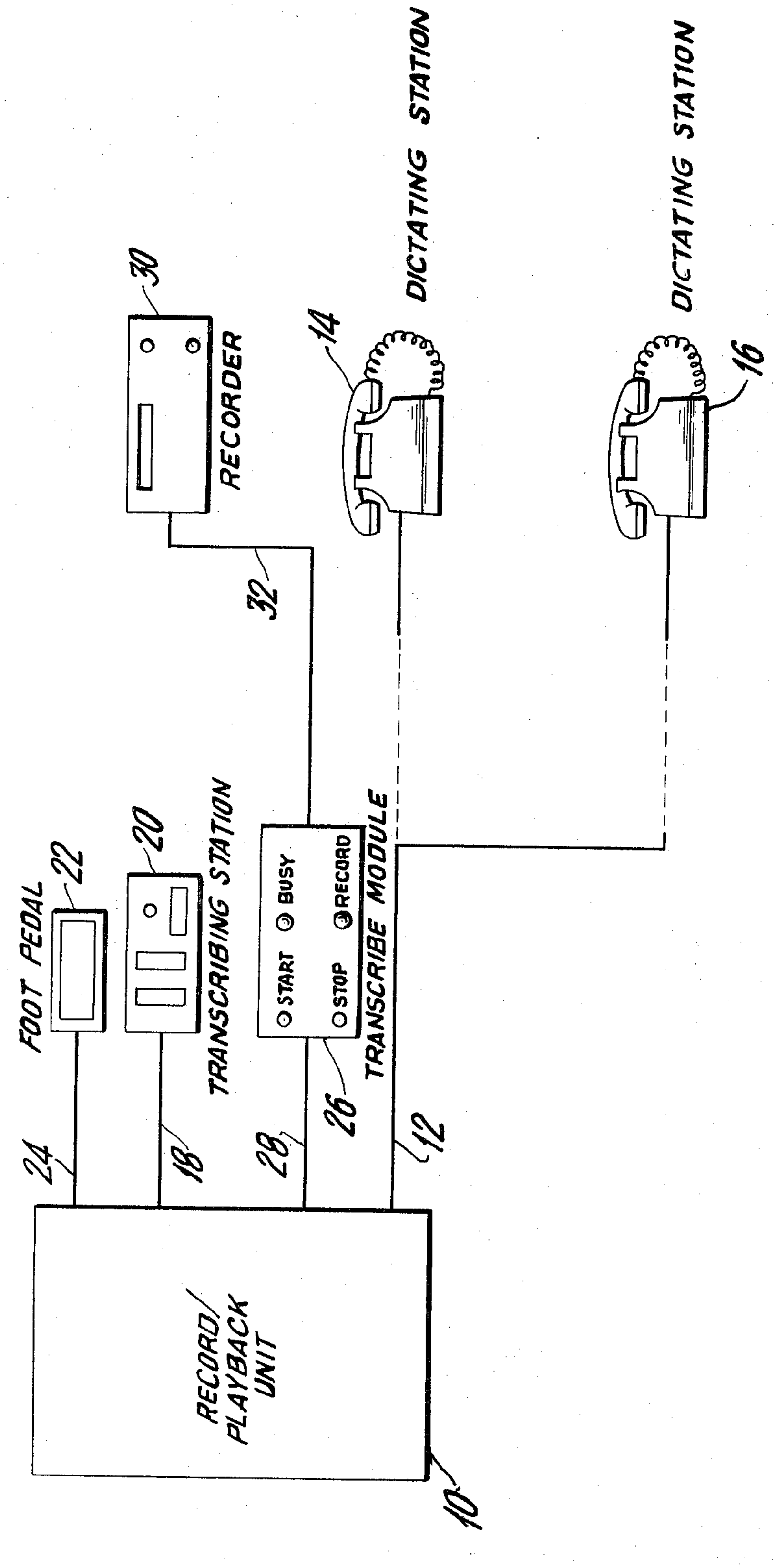
FIG. 1 is a diagrammatic illustration of a remote station dictating system in which the invention is intended to be used and including the transcribe module of the invention.

Referring now more particularly to FIG. 1 a dictating/playback system is diagrammatically illustrated as comprising a central record/playback unit 10 of the endless loop type which is connected through a multi-conductor cable 12 to a plurality of remote dictating stations illustrated generally by dictating stations 14 and 16 which are connected in parallel with the record/playback unit 10. The record/playback unit 10 is also connected through a multi-conductor cable 18 to a transcribing station 20. At the transcribing station messages recorded from the dictating stations 14 or 16 on an endless loop of magnetic tape (not shown) within the record/playback unit 10 may be played back over the transcribing station 20 to a typist. The transcribe mode of the record/playback unit 10 is controlled by a typist with a foot pedal 22 connected to the record/playback unit through a cable 24. The dictate/playback/rewind modes at each dictating station are controlled at the particular dictating station 14 or 16.

When any dictating station is being used ("activated") to record or play back messages on the tape loop within the record/playback unit 10, the remaining remote dictating stations connected in parallel with it are blocked from controlling the record/playback unit and are unable to hear what is being recorded or played back through the activated remote dictating station by means of the privacy and seizure control circuit described in the co-pending application noted above.

A transcribe module 26 is also connected to the central record/playback unit 10 by a multi-conductor cable 28. The transcribe module 26 is further connected to an external recorder 30 by a multi-conductor cable 32. The recorder 30 is not shown in detail and may be of the cassette recorder type, for example. As stated above the purpose of the transcribe module 26 is to allow audio signals recorded on the external tape and played back by the recorder 30 to be re-recorded on the endless loop of tape within the central record/playback unit 10 and then transcribed at the transcribing station 20. The advantage of this procedure is that typically such external cassette type tape recorders do not have the efficient transcribing functions of the transcribing station 10, such as foot pedal-operated backspacing, for example.

Figure 2:
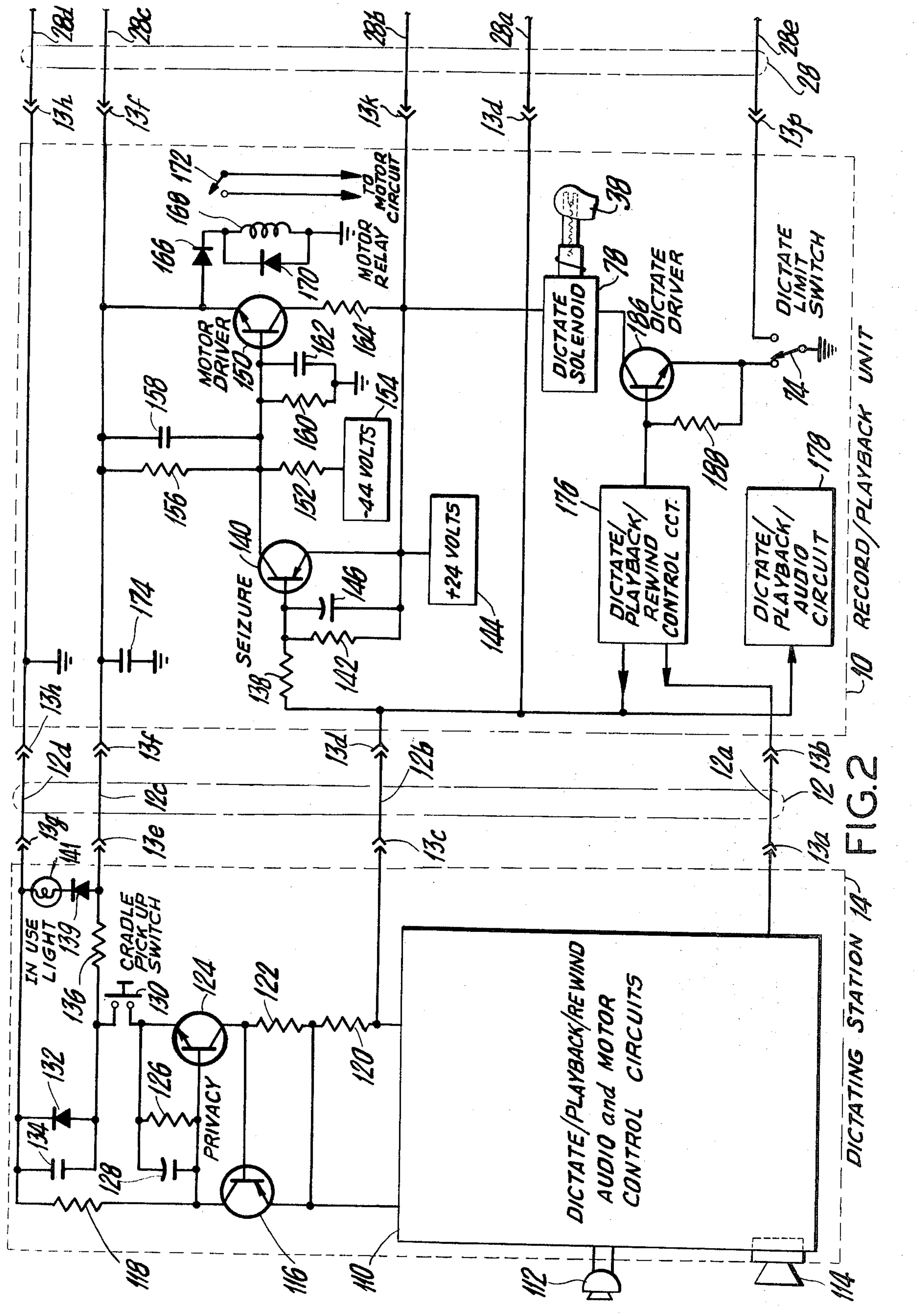
FIG. 2 is a schematic diagram of the seizure control circuit of the remote dictating station and of the central record/playback unit of the system depicted in FIG. 1.

Referring now more particularly to FIG. 2 the remote dictating station 14, illustrated as being enclosed by a dotted line, includes dictate, playback, rewind, audio and motor control circuits designated generally 110, a microphone 112 and a playback speaker 114 connected to the circuits 110. The circuits 110 supply the audio signal hich is recorded at the central record/playback mechanism 10 and also provide control signals to control the record/playback unit motor and the electromagnetic tape loop handling mechanisms (not shown) within the central record/playback unit 10. These electromagnetic mechanisms are discussed in greater detail in the co-pending applications referred to above. Also the details of the circuits 110 are not shown since they are not relevant to the invention and may comprise any of various circuits of this type known to the art or they may comprise circuits of the type disclosed in the aforementioned co-pending applications of which the applicant is an inventor.

A lead 12*a* in the multi-conductor cable 12 is connected between an external terminal 13*a* at the remote dictating station 14 and an external terminal 13*b* at the central record/playback unit 10. A lead 12*b* in the multiconductor cable 12 is connected between an external terminal 13*c* of the remote dictating station and an external terminal 13*d* at the central record/playback unit. The circuits 110 are connected directly to the terminals 13*a* and 13*c*.

The circuits 110 are also connected to the emitter electrode of a PNP transistor 116 whose collector electrode is connected through a resistor 118 to the external terminal 13*g* at the dictating station 14. The external terminal 13*g* is connected through a wire 12*d* within the multiple conductor cable 12 to an external terminal 13*h* at the record/playback mechanism 10. The terminal 13*h* is connected to the circuit ground within the record/playback unit 10.

The emitter electrode of the transistor 116 is connected to the terminal 13*c* through a resistor 120 and to its own base electrode through a resistor 122. The base electrode of the transistor 116 is connected to the collector electrode of an NPN transistor 124. The base electrode of the transistor 124 is connected directly to the collector electrode of the transistor 116 and through a resistor 126 to the emitter electrode of the transistor 124. A capacitor 128 is connected in parallel with the resistor 126. The emitter electrode of the transistor 124 is connected to one lead of a normally open, cradle pickup switch 130 whose other lead is connected to the anode of a diode 132. The cathode of the diode 132 is connected to the grounded external terminal 13*g*. The normally open cradle pickup switch 130 is closed when the handset of the dictating station is lifted from its cradle.

A capacitor 134 is connected in parallel with the diode 132. The anode of the diode 132 is connected through a resistor 136 to the anode terminal of a diode 138 whose cathode terminal is connected through an "in use" light 141 to the terminal 13*g*. The anode terminal of the diode 139 is also connected to an external terminal 13*e* at the dictating station 14. The terminal 13*e* is connected by a wire 12*c* in the multiple conductor cable 12 to an external terminal 13*f* at the record/playback unit 10.

The external terminal 13*d* of the record/playback unit 10 is connected through a resistor 138 to the base electrode of a PNP "seizure" transistor 140 and through a resistor 142 to a bias source 144 of + 24 volts. A capacitor 146 is connected in parallel with the resistor 142. The emitter electrode of the transistor 140 is connected to the bias source 144.

The collector electrode of the transistor 140 is connected to the base electrode of an NPN, motor driver transistor 150 and through a resistor 152 to a bias source 154 of − 44 volts. The collector electrode of the transistor 140 is further connected to the external terminal 13*f* through a resistor 156 connected in parallel with a capacitor 158. The external terminal 13*f* is connected to the circuit ground through a capacitor 174.

The base electrode of the transistor 150 is connected to the circuit ground through a resistor 160 connected in parallel with a capacitor 152. The collector electrode of the transistor 150 is connected through a resistor 164 to the bias source 144 which is also connected to an external terminal 13*k* at the central record/playback unit 10. The emitter electrode of the transistor 150 is connected directly to the terminal 13*f* and to the anode of a diode 166 whose cathode is connected to one lead of the coil of a motor control relay 168. The other lead of the relay coil 168 is connected to the circuit ground. The anode of a diode 170 is connected to the circuit ground and the cathode of the diode 170 is connected to the cathode of the diode 166. The purpose of the diode 170 is to provide a shunt circuit for back EMF generated in the relay coil 168 when voltage is rapidly supplied and discontinued through the diode 166. The motor relay 168 opens and closes a pair of relay contacts 172 to energize the tape loop transport motors (not shown) of the record/playback unit 10.

The external terminal 13*d* is connected to a separate input of a dictate/playback/rewind control circuit 176 and to a dictate/playback audio circuit 178 which are within the record/playback unit 10. The circuits 176 and 178 are not shown in detail since they are not directly pertinent to the present invention and they may comprise circuits of the type known to those skilled in the art. As is explained in greater detail hereinafter and in the aforementioned co-pending applications, the control circuits 110 in the dictating unit 14 activate the circuits 176 and 178 by providing a circuit ground return path to the "input" leads of the circuits 176 and 178. It is to be understood that a plurality of dictating stations are connected in parallel through the multiple conductor cable 12 to the terminals 13*b*, 13*d*, 13*f* and 13*h* of the record/playback unit 10.

In operation, when the hand unit of a particular dictating station, such as dictating station 14, is lifted from its cradle the cradle pickup switch 130 is closed thereby supplying a − 44 volt bias from the source 154 through the resistors 152, 156 and 136 and the switch 130 to the emitter electrode of the transistor 124. The − 44 volt bias supplied to the emitter electrode of the transistor 124 also flows through the resistors 126 and 118 to the circuit ground thereby developing a positive bias voltage on the base of transistor 124 which makes it become conductive or "on".

When transistor 124 becomes conductive, current from the + 24 volt source 144 flows through the resistors 142, 138, and 120, the emitter-base junction of the transistor 116 in parallel with the resistor 122, the collector-emitter junction of the transistor 124, the switch 130 and the diode 132 to the circuit ground. The voltage drop developed across the resistor 122 places a negative bias on the base of the transistor 116 with respect to its emitter thereby making it conductive. When transistor 116 becomes conductive it supplies a positive bias to the base of transistor 124 from the junction of the resistors 120 and 122 and thus the transistors 116 and 124 "lock up" on each other in the conductive condition.

The flow of bias current from the + 24 volt source 144 through the resistor 142 as described above also develops a negative bias voltage on the base electrode of the transistor 140 thereby turning it on. When transistor 140 thus becomes conductive, current from the + 24 volt source 144 flows through the emitter-collector junction of the transistor 140 and the resistor 160 to the circuit ground thereby providing a positive bias voltage to the base of the motor driver transistor 150. This causes the transistor 150 to become conductive and thereby supply a voltage from the + 24 volt source through the collector load resistor 164 and the collector-emitter junction of the transistor 150 to the motor relay 168 through the semiconductor diode 166. The current flowing through the motor relay 168 energizes it and closes the contact switch 172 to thereby turn the record/playback unit motors on.

The positive voltage supplied to the motor relay 168 at the emitter electrode of the motor driver transistor 150 is also supplied to the external terminal 13*e* of the dictating station. The resistances 156 and 152 in series with the − 44 volt source 154 are sufficiently high in magnitude that the potential developed at the external terminal 13*e* after the motor driver transistor 150 becomes conductive is substantially + 24 volts. The + 24 volt potential at terminal 13*e* flows through the diode 139 and the in use lights 141 of each of the dictating stations which are connected in parallel with the dictating station 14. The in use lights 141 are thu lighted to indicate that control of the central record/playback unit 10 has been seized.

This positive bias voltage at terminal 13*e* also prevents any other dictating stations from seizing control of the system. When a particular cradle pickup switch 130 in any other dictating station is closed subsequent to the seizure of control by one dictating station there is no − 44 volt bias voltage to be applied to the emitter electrode of the transistor 124 connected to the closed pickup switch 130. this prevents the transistor pairs 116 and 124 from locking up on each other and thereby prevents the other dictating stations from seizing control of the system.

All of the audio and control circuits 110 of the remote dictating station 14 and the transcribe module 26 require a ground return connection to the circuit ground terminal 13*h* of the record/playback unit 10 in order to operate. When a remote dictating station 14 has seized control of the central record/playback unit 10 this ground return is supplied by the series connection through the resistor 120, the emitter-base junction of the transistor 116 in parallel with the resistor 122, the collector-emitter junction of the transistor 124, the cradle pickup switch 130, the diode 132, and the lead 12*d* to the circuit ground terminal 13*h*. Thus the other dictating stations connected in parallel with the activated dictating station 14 are disabled from controlling the central record/playback unit 10 so long as one dictating station 14 has seized control of the system because in the other dictating stations the transistors 124 are in their non-conductive or open state, and as explained above, may not be made conductive because of the + 24 volt bias voltage applied to the lead 12*c*. In such other dictating stations the circuit ground return path is reverse biased to be electrically "open".

The base electrode of an NPN, dictate driver transistor switch 186 is connected to the output of the dictate/playback/rewind circuit 176. The collector electrode of the transistor 186 is connected to one lead of a dictate solenoid 78 which operates a pressure roller-capstan arrangement 38 (not shown in detail) to advance the loop of magnetic tape within the central record/playback unit. The other lead of the dictate solenoid 78 is connected to the + 24 volt source 144. The emitter electrode of the transistor 186 is connected to the circuit ground through a normally closed, single pole-double throw dictate limit switch 74. The base electrode of the transistor 186 is also connected to the emitter electrode of the transistor 186 through a resistor 188. The normally open terminal of the dictate limit switch is connected to an external terminal 13*p* at the central record/playback unit 10.

Figure 3:
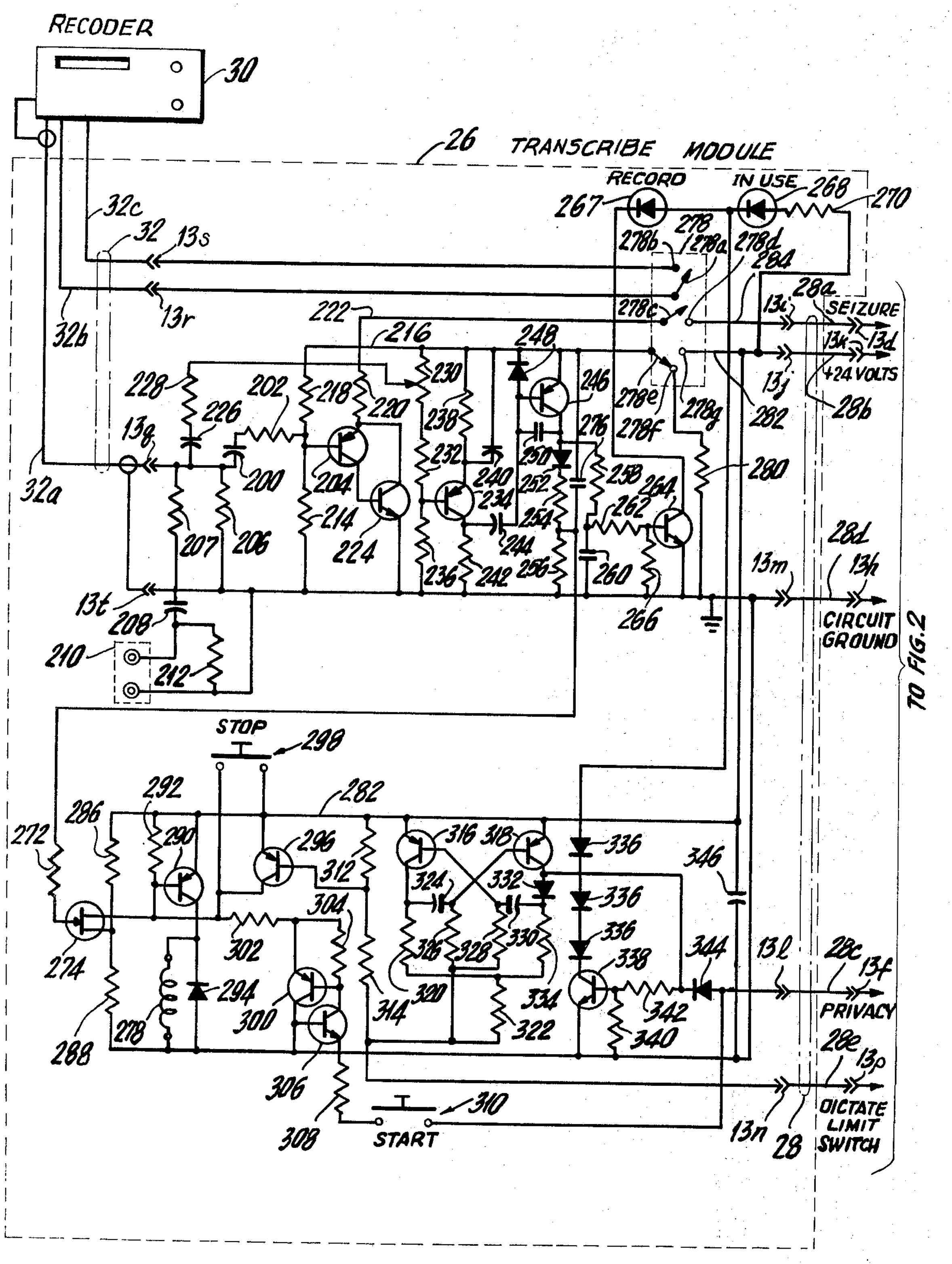
FIG. 3 is a schematic diagram of the transcribe module of the invention.

Referring now more particularly to FIG. 3 the details of the transcribe module 26 are illustrated. The audio signal from the external tape recorder 30 is supplied through a shielded lead 32*a* to an external terminal 13*q* at the transcribe module 26. The shielding for the lead 32*a* is connected to the circuit ground of the transcribe module 26 through an external terminal 13*t*. The terminal 13*q* is connected through a capacitor 200 in series with a resistor 202 to the base electrode of a PNP transistor 204. The terminal 13*q* is also connected to the circuit ground through a resistor 206. In addition the terminal 13*q* is connected through a resistor 207 in series with a capacitor 208 to one receptacle of an external earphone jack 210. The other receptacle of the jack 210 is connected to the circuit ground. A resistor 212 is connected between the receptacles of the earphone jack 210. The base of the transistor 204 is connected to the circuit ground through a resistor 214 and to a bias lead 216 through a resistor 218. The emitter of the transistor 204 is connected through a resistor 220 to a seizure control lead 222.

The collector of the transistor 204 is connected to the base of an NPN transistor 224 and the emitter of the transistor 204 is connected directly to the collector of the transistor 224. The emitter of the transistor 224 is connected directly to the circuit ground. As will be explained in greater detail hereinafter the audio signals pre-amplified by the transistors 204 and 224 are supplied via the audio and seizure control lead 222 to the input at terminal 13*d* of the central record/playback unit 10.

The terminal 13*q* is also connected through a capacitor 226 in series with a resistor 228 to the sliding contact of a potentiometer 230. One of the fixed contacts of the potentiometer 230 is connected to the bias lead 216 and the other contact is connected in series through a resistor 232 to the base of a PNP transistor 234 and through a resistor 236 to the circuit ground. The emitter of the transistor 234 is connected through a resistor 238 to the bias lead 216. A capacitor 240 is connected in parallel with the resistor 238. The collector of the transistor 234 is connected through a resistor 242 to the circuit ground and through a capacitor 244 to the base of a PNP transistor 246.

The base of the transistor 246 is connected to the anode of a diode 248 whose cathode is connected to the bias lead 216. A capacitor 250 is connected between the base of the transistor 246 and its collector. The emitter of the transistor 246 is connected directly to the bias lead 216. The collector of the transistor 246 is connected to the anode of a diode 252 whose cathode is connected in series with resistors 254 and 256 to the circuit ground. The collector of the transistor 246 is also connected in series with a resistor 258 and a capacitor 260 to the circuit ground and in series with the resistor 258 and a resistor 262 to the base of an NPN transistor 264.

The base of the transistor 264 is also connected to the circuit ground through a resistor 266. The emitter of the transistor 264 is connected directly to the circuit ground and the collector is connected to the cathode of a light emitting diode 267 whose anode is connected to the cathode of another light emitting diode 268. The anode of the diode 268 is connected through a resistor 270 to an external terminal 13*j* at the transcribe module. The terminal 13*j* is connected via a lead 28*b* in the multiple cable 28 to the terminal 13*k* at the central record/playback unit which is supplied with + 24 volts from a voltage source.

The junction of the resistors 254 and 256 is connected through a resistor 272 to the gate electrode of a field effect transistor 274. The gate electrode of the transistor 274 is also connected through the resistor 272 in series with a capacitor 276 to the bias lead 216.

The external tape recorder 30 is controlled by two control leads 32*b* and 32*c* which are part of the multiple conductor cable 32. The leads 32*b* and 32*c* are connected respectively to external terminals 13*r* and 13*s* at the transcribe module 26. The terminals 13*r* and 13*s* are connected, respectively to the switch contacts 278*a* and 278*b* of a relay 278. Thus when the relay 278 is energized the external recorder 30 is caused to be activated.

The seizure lead 222 is connected to the switch contact 278*c* of the relay 278 and the corresponding switch contact 278*d* is connected to an external terminal 13*i* at the transcribe module. The switch contact terminal 278*d* of the relay 278 is connected to the external terminal 13*i* of the transcribe module by a lead 284. The external terminal 13*i* is connected via a lead 28*a* of the multiple conductor cable 28 to the external terminal 13*d* of the central record/playback unit 10. The bias lead 216 is connected to the moving contact 278*e* of the relay 278. The moving contact 278*e* constitutes the pole arm of a single pole, double throw switch and the normally closed contact 278*f* of the switch is connected through a resistor 280 to the circuit ground. The normally open contact 278*g* of the relay 278 is connected to the external terminal 13*j* at the transcribe module by a bus lead 282.

The drain electrode of the field effect transistor 274 is connected to the bias lead 282 by a resistor 286 and to the circuit ground by a resistor 288. The source electrode of the transistor 274 is connected directly to the base of a PNP transistor 290 whose emitter is connected directly to the bias lead 282. The base of the transistor 290 is also connected to the bias lead 282 through a resistor 292. The collector of the transistor 290 is connected to the circuit ground through the coil of the relay 278 and is also connected to the cathode of a diode 294. The anode of the diode 294 is connected to the circuit ground. The purpose of the diode 294 is to provide a shunt for back EMF generated in the coil of the relay 278.

The source electrode of the transistor 274 is also connected to the collector of a PNP transistor 296 and to one terminal of a normally open, push button, stop switch 298. The other terminal of the switch 298 is connected to the bias lead 282 and to the emitter of the transistor 296. The collector of the transistor 296 is connected to the emitter of a PNP transistor 300 through a resistor 302.

The base and emitter electrodes of the transistor 300 are connected together through a resistor 304. The collector of the transistor 300 is connected to the base of an NPN transistor 306 and to the circuit ground. The base of the transistor 300 is connected to the collector of the transistor 306. The emitter of the transistor 306 is connected through a resistor 308 to one terminal of a normally open, push button, start switch 310.

The base of the transistor 296 is connected to the bias lead 282 through a resistor 312 and is also connected through a resistor 314 to an external terminal 13*n* of the transcribe module. The external terminal 13*n* is connected by a lead 28*e* in the multi-channel cable 28 to the external terminal 13*p* at the central record/playback unit.

A pair of PNP transistors 316 and 318 are connected together in a multi-vibrator configuration and have their emitters connected to the bias lead 282. The collector of the transistor 316 is connected in series with a resistor 320 and a resistor 322 to the external terminal 13*n.* The collector of the transistor 316 is also connected to the base of the transistor 318 through a capacitor 324. The base of the transistor 318 is connected to the external terminal 13*n* through a resistor 326. The base of the transistor 316 is connected to the external terminal 13*n* through a resistor 328 and is also connected through a capacitor 330 to the cathode of a diode 332. The anode of the diode 332 is connected to the collector of the transistor 318. The cathode of the diode 332 is connected in series with a resistor 334 and the resistor 332 to the external terminal 13*n*.

The cathode of the light emitting diode 268 is connected in series through three diodes generally designated 336 which are connected in series and with the same polarity to the collector electrode of an NPN transistor 338. The diodes 336 are oriented such that the anode of the first diode is connected to the cathode of the light emitting diode 268 and the cathode of the last diode 336 is connected to the collector electrode of the transistor 338.

The emitter electrode of the transistor 338 is connected to the circuit ground. The base electrode of the transistor 338 is connected through a resistor 340 to the circuit ground and through a resistor 342 to the collector electrode of the transistor 318. The collector electrode of the transistor 318 is also connected to the cathode of a diode 344 whose anode is connected to an external terminal 13*l* of the transcribed module. The external terminal 13*l* is connected through a lead 28*c* in the multiple conductor cable 28 to the external terminal 13*f* at the central record/playback unit 10.

The external terminal 13is also connected to the other terminal of the push button start switch 310. A capacitor 346 is connected between the bias lead 282 and the circuit ground. The circuit ground of the transcribe module is connected to an external terminal 13*m* at the transcribe module. The external terminal 13*m* is connected through a lead 28*d* in the multiple conductor cable 28 to the external terminal 13*h* at the central record/playback unit.

In operation, a pre-recorded tape is inserted within the external tape recorder 30 and the operator then pushes the start switch 310 closed. This places an approximately −10 volt bias on the emitter of transistor 306 from the −44 volt source 154 through the resistors 152 and 156 (FIG. 2). The base of transistor 306 is at ground potential which is in effect a positive voltage with respect to its emitter. This biases the transistor 306 to become conductive or "on". When transistor 306 turns on it places a negative bias on the base of transistor 300 making it conductive or "on".

When the transistor 300 becomes conductive, it develops a negative bias on the base of the transistor 290 with respect to its emitter thereby turning it on. When the transistor 290 turns on, the current flow from the lead 282 through the emitter-collector junction of the transistor 290 and the coil of the relay 278 to the circuit ground, thereby energizing the relay 278 and causing all of the switch contact pairs 278*a*–278*b*, 278*c*–278*d*, and 278*e*–278*g* to close and the switch contacts 278*e*–278*f* to open.

When the contact 278*a* closes with the contact 278*b* the external recorder 30 is activated and the recorded audio signal is supplied to the external input terminal 13*q*. When the contact 278*e* closes with the contact 278*g* a + 24 volt bias is supplied through the lead 216 to the pre-amplifier circuit comprised of the transistors 204 and 224 and to the portion of the voltage activated switch circuit which includes the transistors 234 and 246. The closed contacts 278*c* and 278*d* feed the audio output signal from the pre-amplifier through the leads 222, 284, and 28*a* to the dictate/playback audio circuit 178 of the central record/playback unit connected to terminal 13*d*. The DC ground return path provided through the transistors 204 and 224 not only makes the seizure transistor 140 become conductive and thereby causes the central record/playback unit to be seized, but it also energizes the dictate/playback/rewind control circuit 176, the dictate driver switch 186 and the dictate solenoid mechanism 78, thereby engaging the tape loop to begin the re-recording of the message from the tape in the external recorder onto the tape loop within the central record/playback unit.

As was described above, when the central record/playback unit is seized, a + 24 volt bias is supplied to all of the terminals 13*e* in the remote dictating stations to prevent them from seizing control of the central record/playback unit. The in-use lights 141 of each of the remote dictating stations are lit by this + 24 volt reverse bias to indicate that the central record/playback unit has been seized.

Furthermore, when the central record/playback unit seizes, a + 24 volt reverse bias is placed on the privacy line at external terminal 13*f* of the central record/playback unit which is connected to the terminal 13*l* of the transcribe module. This places a positive bias on the base of transistor 338 which in turn energizes the light emitting diode 268 to indicate that the transcribe module is in use.

The positive bias at terminal 13*l* also causes the transistors 300 and 306 to become non-conductive, in the reverse of the start-up operation described above, and at this point the transistor 290 is maintained in its conductive condition only by current flowing through the resistor 292 and the source and drain electrodes of the transistor 274. The transistor 274 is biased into its conductive state because the audio signal through transistor 246 from the output of the transistor 234 maintains a positive bias on the gate electrode of the transistor 274. Had this positive bias from the privacy lead 28*c* been present at terminal 13*l* prior to the initial closing of the start switch 310, that is, if the central record/playback unit 10 had already been seized by one of the remote dictating stations, then the transcribe module 26 would not be activated by the closing of the start switch 310.

As audio signals are supplied from the external tape recorder 30 through the voice activated switch circuit to drive the transistor 246, the light emitting diode 267 will flash accordingly. If the incoming audio signal is interrupted for 12 seconds or more, for example, at the end of the dictated message on the external tape, the capacitor 276 will become fully charged thereby placing a negative bias on the gate electrode of the transistor 274 through the resistor 272. Capacitor 276 will charge because of the removal of the discharge path through the transistor 246.

When the transistor 274 becomes non-conductive because of this negative bias on its gate electrode, the transistor 290 becomes non-conductive because the negative bias applied to its base is cut off. The turning off of transistor 290 de-energizes the relay coil 278. When the relay 278 is de-energized its contacts open, shutting down the operation of the transcribe module and returning the central record/playback unit to its normal operation.

The transcribe module 26 may also be shut down in two other ways. When the loop of tape within the central record/playback unit 10 which is available for dictation is exhausted it becomes taut and thereby throws the contact arm of the dictate limit switch 74 to connect the external terminal 13*p* of the central record/-playback unit 10 with the circuit ground and simultaneously disconnect the emitter electrode of the dictate driver transistor 186 from the circuit ground. This causes the dictate driver switch 186 to become non-conductive and thereby de-energize the dictate solenoid 78 so that the tape loop is no longer driven by the central record/playback unit (as is described in greater detail in the above-mentioned co-pending application for a Farthest Advance Circuit).

The external terminal 13*p* at the central record/-playback unit is connected to the external terminal 13*n* of the transcribe module so that a negative bias is placed on the base of the transistor 296 thereby turning it on. When the transistor 296 turns on it places a positive bias on the base of the transistor 290, turning it off. When the transistor 290 turns off, it opens the energizing path for the relay 278 thereby opening its contacts and turning off the transcribe module as well as the external tape recorder 30. The closing of the dictate limit switch 74 also activates the multi-vibrator circuit comprised of the transistors 316 and 318 which supply an alternating bias to the base of the transistor 338 thereby causing the light emitting diode 268 to flash as an indication to the operator that the loop of tape available for recording in the central record/playback unit has been exhausted.

Still another method of shutting down the transcribe module is to close the switch 298 which places a negative bias on the base of the transistor 290 thereby causing it to become non-conductive and to de-energize the relay 278.

It should be apparent that although the external recorder 30 is described as a tape recorder it may be any sort of signal source such as a radio or television receiver, or the like.

Furthermore while transistors of certain conductivity types have been described above it should be apparent that in other embodiments transistors of different conductivity types may be substituted with appropriate changes in the polarities of the biasing circuits. In still other embodiments other types of semiconductor electronic switches, such as silicon controlled rectifiers, by way of example only, may be substituted individually or for combinations of the switching transistors such as transistors 116, 124, 140, 150, 186, 274, 290, 296, 300, 306 and 338.

The terms and expressions which have been employed here are used as terms of description and not of limitation, and there is no intention in the use of such terms and expressions, of exluding equivalents of the features shown and described, or portions thereof, it being recognized that various modifications are possible within the scope of the invention claimed.

What is claimed is:

1. A circuit for interconnecting an external source of pre-recorded signals with a central record/playback unit of a dictating system of the type having an endless recording loop for re-recording said pre-recorded signals on said endless recording loop, said central record/playback unit including energizable seizure control means for enabling the recording of signals on said endless recording loop, the interconnecting circuit comprising actuable pre-amplifier means for receiving the signals from the external source and for supplying the amplified signals to the input of the central record/-playback unit for re-recording, means responsive to the actuation of said pre-amplifier means to energize the seizure control means of the central record/playback unit, and signal activated switching means responsive to the signals from the external source for deactivating the external source and the seizure control means if the signals from the external source cease for a predetermined period of time.

2. A circuit as recited in claim 1 wherein the central record/playback unit includes a loop tautness sensing switch which is activated when the loop of available recording material for dictation has been exhausted, and wherein the interconnecting circuit further comprises an indicator circuit which is responsive to the activation of the recording loop tautness switch for presenting a visual indication and for deenergizing the seizure control means to terminate the re-recording operation when the available loop of recording material has been exhausted.

3. A circuit for coupling a central record/playback unit of an endless tape loop recording system with an external, magnetic tape recorder/playback machine, the central record/playback unit having a recording section and a seizure control section, said seizure control section enabling the recording of signals on said endless loop of tape upon being energized, the coupling circuit comprising an audio pre-amplifier for receiving and amplifying audio signals received from the external recorder/playback machine and for supplying the amplified audio signals to the recording section of the central record/playback unit for re-recording on the endless loop of tape, and signal operated switch means responsive to the presence of the audio signals from the external recorder/playback machine for selectively controlling both the seizure control section of the central record/playback unit and the external recorder/-playback machine.

4. A circuit as recited in claim 3 wherein the signal operated switch means includes means for disconnecting the audio pre-amplifier from the central record/-playback unit and for stopping the external recorder/-playback machine a predetermined time after the cessation of the supply of audio signals from the external recorder/playback machine.

5. A circuit as recited in claim 3 wherein the central record/playback unit further includes privacy means for producing a privacy control signal when the seizure control section is activated and the coupling circuit further includes means responsive to the privacy control signal to prevent the signal operated switch means from being initially activated throughout the duration of the privacy control signal.

6. An improved record/playback dictating system of the type having a plurality of remote dictating stations connected to at least one common terminal at a central record/playback unit, the remote dictating stations each including a record/playback/rewind function control circuit and a separate privacy and seizure control circuit, the central record/playback unit having an endless loop of recording material, means for recording signals on and playing signals back from the recording material and electromechanical means for movably supporting the loop of recording material during the recording of signals on the recording material, wherein the improvement comprises a privacy and seizure control circuit for each remote dictating station including electronic first switch means connected in series between the record/playback/rewind function control circuit and the common terminal, first means at the central record/playback unit for selectively supplying a first bias voltage of a predetermined polarity to the first switch means to make it become substantially conductive, second bias means at the central record/playback unit for supplying a second bias voltage of a polarity opposite to that of the first bias voltage, electronic second switch means responive to the conductive state of the first switch means and connected between the second bias means and the first switch means for supplying the second voltage to the first switch means to maintain it in its substantially conductive state when the first switch means is made substantially conductive by the first bias means, electronic third switch means at the central record/playback unit, the third switch means including a control electrode and a resistance element connected between the control electrode and the second bias means, the third switch means being conductively responsive to the flow of current from the second bias means through the resistance element, the third switch means being connected between the second bias means and the electromechanical means for supplying the second voltage to activate the electro-mechanical means when the third switch means is conductive, the electro-mechanical means including means connected in series between the second bias means and the first switch means of each remote dictating station to supply the second voltage as a potential reverse bias voltage to the first switch means of each remote dictating station when the electromechanical means is activated, thereby preventing the seizure control circuits of the remote dictating stations from thereafter becoming activated, coupling means for interconnecting an external source of pre-recorded signals with the central record/-playback unit, the coupling means including preamplifier means for receiving and amplifying the signals from the external source, means for supplying the amplified signals from the pre-amplifier means to the input of the central record/playback unit for re-recording, the pre-amplifier means including a direct current return path to the common terminal for causing current to flow from the second bias means through the resistance element of the third switch means to make the third switch means become conductive and activate the electro-mechanical means, thereby reverse biasing the first switch means of each remote dictating station, and signal activated switching means responsive to the signals from the external source for interrupting the direct current return path through the pre-amplifier means when the signals from the external source cease for a predetermined period of time, thereby making the third switch means non-conductive and deactivating the electro-mechanical means.

7. An improved record/playback dictating system as recited in claim 6 wherein the coupling means further comprises means responsive to the reverse bias voltage from the electromechanical means to prevent the coupling circuit from becoming activated if the central record/playback unit has already been seized by one of the remote dictating stations.

* * * * *